April 8, 1969

R. H. ABPLANALP 3,437,272

VALVE ACTUATOR FOR PRESSURIZED DISPENSERS

Filed Feb. 2, 1966

INVENTOR.
ROBERT HENRY ABPLANALP
BY
Davis, Hoxie, Faithfull & Hapgood
ATTORNEYS.

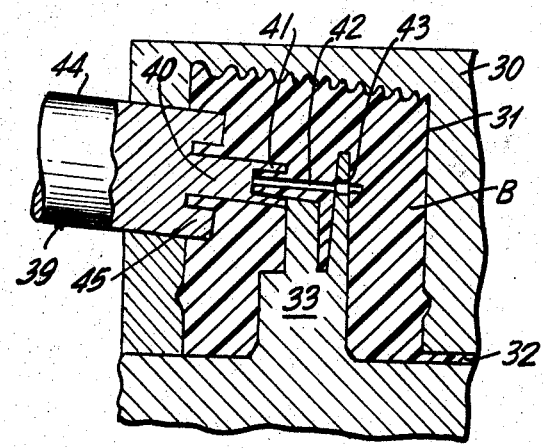
FIG. 7
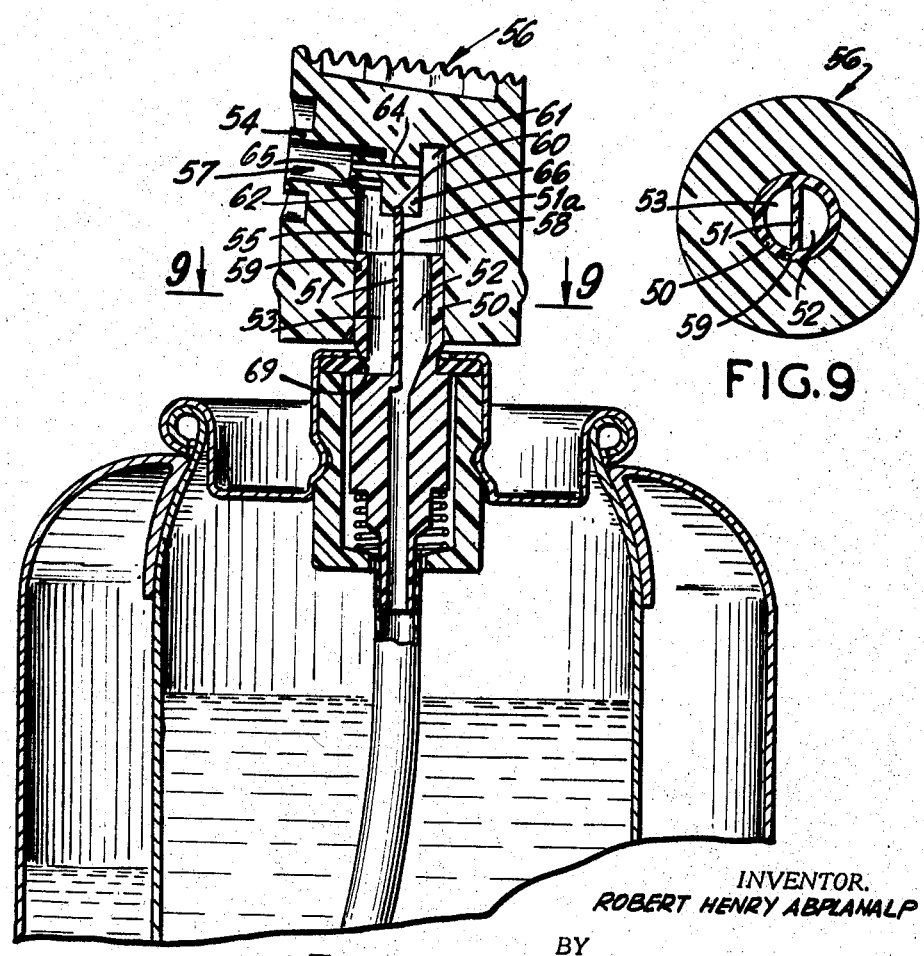
FIG. 8
FIG. 9
INVENTOR.
ROBERT HENRY ABPLANALP

United States Patent Office 3,437,272
Patented Apr. 8, 1969

3,437,272
VALVE ACTUATOR FOR PRESSURIZED DISPENSERS
Robert Henry Abplanalp, 10 Hewitt Ave., Bronxville, N.Y. 10708
Filed Feb. 2, 1966, Ser. No. 524,527
Int. Cl. B05b 11/00, 7/30
U.S. Cl. 239—307                            12 Claims

ABSTRACT OF THE DISCLOSURE

A valve actuator and dies for making it for use with a pressurized dispenser having separate product and propellant containers and separate conduits leading respectively therefrom to a discharge zone in the actuator. The actuator includes passages which communicate with the conduits. The passages are arranged to promote discharge with minimum propellant flow.

---

This invention relates to a one-piece molded actuator suitable for displacement of the valve of a pressurized dispenser of the "isolation" type, said actuator having conduits for conducting a separate flow of product and propellant to a discharge port located therein which conduits in all direction of flow are substantially parallel and, in the preferred form, at their terminal portions near the discharge port are concentric.

The dispensing container of the "isolation" type, in its best form, comprises a pressurized gaseous or gasifiable propellant which is held in a vessel that is mounted within but otherwise is separate from the container for the fluent product to be dispensed and in which the propellant and the product are isolated from one another until mixed at or near a discharge port in the course of discharge.

In such dispenser, a valve located in a top opening of the pressure vessel normally prevents outflow of the pressurized propellant but, on being opened, permits flow of propellant in gaseous vapor form to the discharge port. By the action of an ejector (sometimes called a "venturi") near the discharge port, to which separate flow lines from the product container and the propellant container are respectively connected, the outflow of the propellant when the valve is opened, reduces the pressure in the product flow line and product container and a simultaneous outflow of the product is brought about. By suitably directing the stream of propellant into contact with the stream of fluent product (conventionally by directing the propellant transversely across the mouth of the product flow line) atomization of the product commonly is effected and a spray discharge is produced.

U.S. Patent No. 3,326,469, granted June 20, 1967 and its parent applications Ser. No. 511,537, filed Dec. 3, 1965 and Ser. No. 512,035, filed Nov. 2, 1965, describe and claim an improved dispenser of the "isolation" type. In its preferred form said improved dispenser conveys the product and propellant through separate conduits in the valve to a discharge port located in an associated head structure. The actuator of this invention is suitable for use with said preferred dispensers of the "isolation" type wherein the product conduit passes through the pressure vessel and a valve arranged in a top opening of said vessel.

The accompanying drawings illustrate an embodiment of the invention, but the structure shown is illustrative only, and is not to be understood as defining the limits of the invention.

FIG. 7 is a central section of the female die of the actuator, the male die and the retractable core after molding.

FIG. 8 is a further embodiment of an actuator of this invention suitable for attachment to a hollow valve stem.

FIG. 9 is a plan view at the line 9—9 of FIG. 8.

Figure 1:
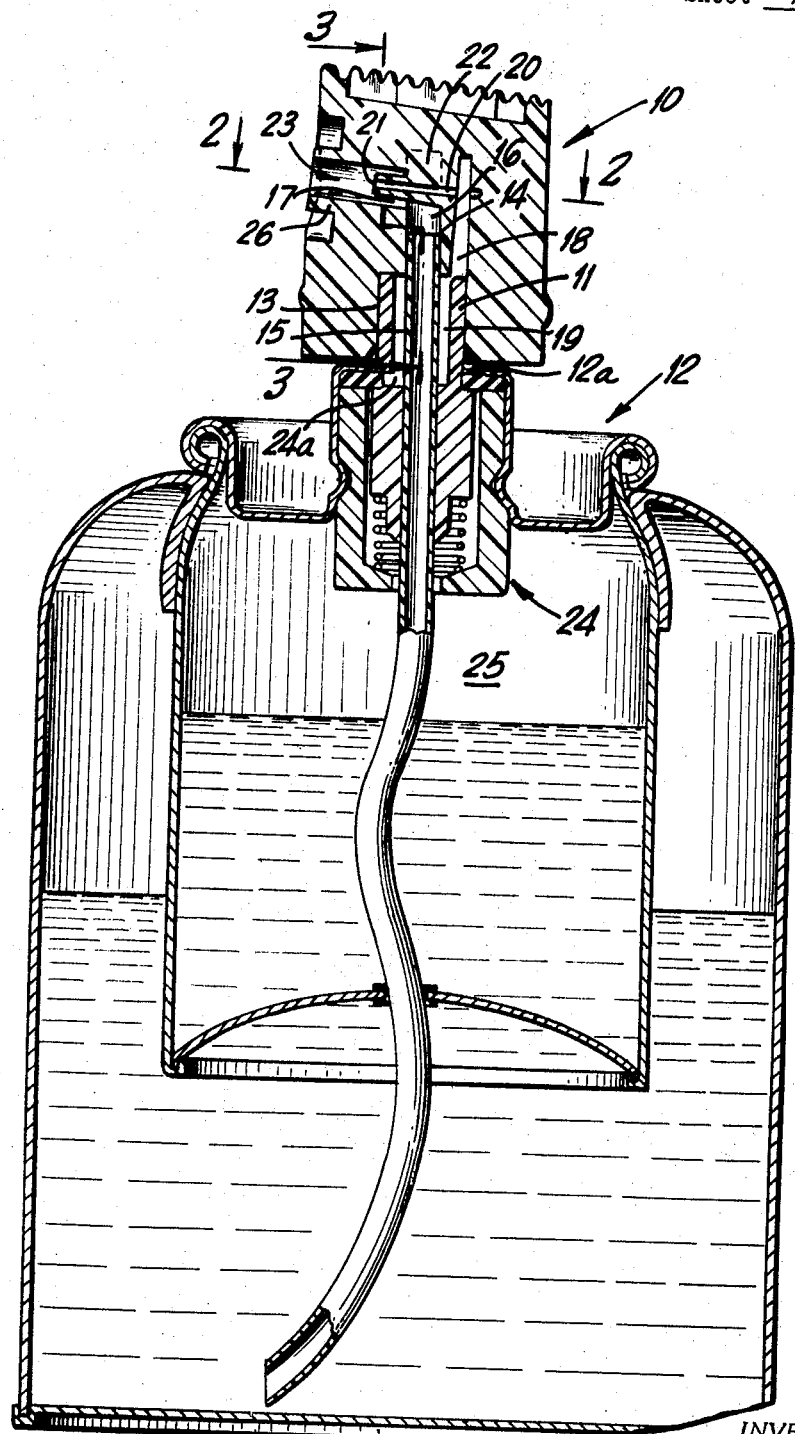
FIG. 1 is a sectional view of a dispensing unit showing an actuator of this invention mounted on a valve stem of a dispensing unit.

Shown in FIG. 1 is an actuator generally designated as 10 mounted on the valve stem 11 which valve stem extends through an opening 12a in the closure 12 of the dispensing unit. The actuator 10 is provided with a first socket 13 to snugly fit the valve stem 11. Extending from and coaxial with the socket 13 is a second socket 14 which is adapted to snugly fit a product tube 15, the edge of the product tube 15 terminating short of the deepest portion of said second socket so as to form chamber 16. As shown more clearly in FIG. 3 the chamber 16 extends upwardly about the depending member 22 to form a U shaped chamber 16 which communicates with an annular lateral conduit 17. The depending member 22 is integral with the body of the actuator and extends into the chamber 16. The conduit 20 extends through the depending member 22, said member acting as a support for the conduit 20. The annular conduit 17 communicates at one end with the chamber 16 and at its other end with an ejector zone 23 defined by the tubular nozzle 26. Rearwardly of the socket 14 and chamber 16 is a conduit 18 which communicates with a conduit 19 in the valve stem 11 defined by the inside wall of the tubular valve stem 11 and the outside wall of the product tube 15 and with a lateral conduit 20, the lateral conduit 20 leading to an ejector zone 23 at its terminal 21. The conduit 17 is concentric to the conduit 20 at the terminal of said conduits emptying into the ejector zone and for some distance inwardly thereof.

In operation, pressure upon the button 10 will open the valve unit, shown generally as 24, and cause a flow of propellant from the pressure container 25, by way of the opening 24a in the valve stem 11, through the conduit 19, the conduit 18, and the conduit 20 to the ejector zone 23. The flow of propellant past the opening of the conduit 17 contiguous to the ejector zone 23 will cause a pressure drop within the product tube 15 and consequent flow of product through said tube, the chamber 16 and the conduit 17 to the ejector zone 23.

Figure 2:
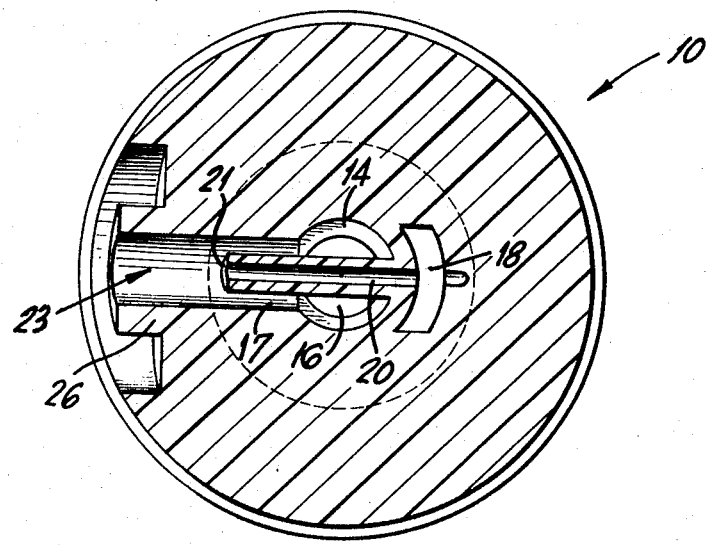
FIG. 2 is a plan view of the actuator along the line 2—2 of FIG. 1.
Figure 3:
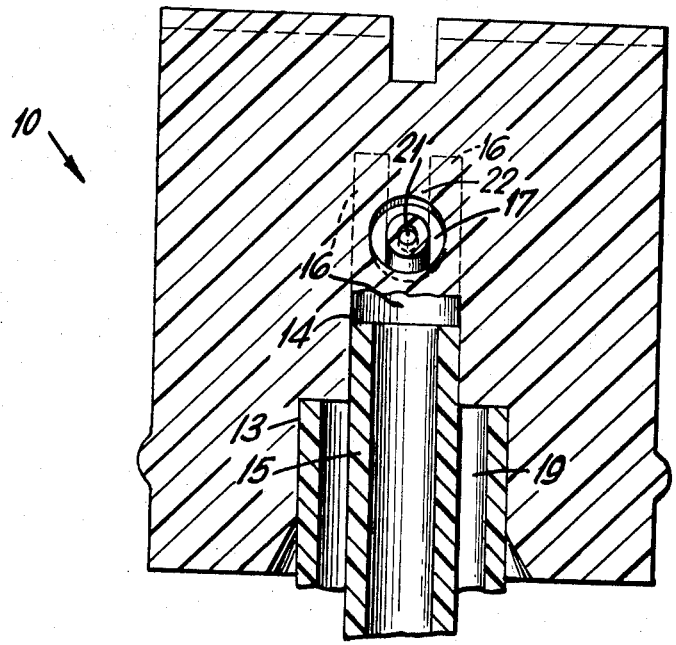
FIG. 3 is a front view of the actuator along the line 3—3 of FIG. 1.
Figure 4:
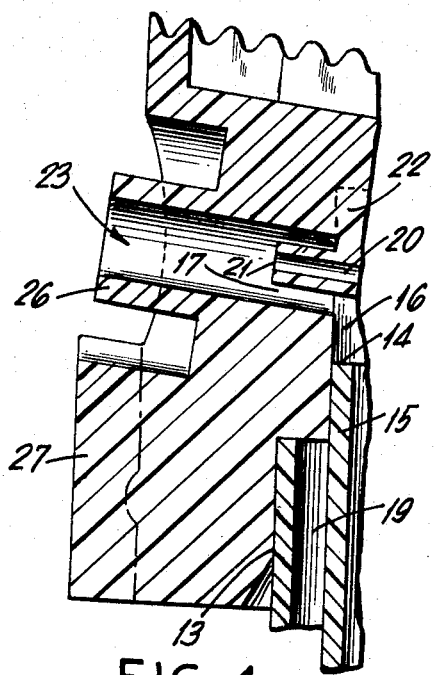
FIG. 4 is a partial sectional view showing a modified embodiment of the actuator of FIG. 1.

A modified form of the actuator of FIGS. 1–3 is shown in FIG. 4, wherein all parts are similar to those as shown in FIGS. 1–3 with the addition that the nozzle 26 is extended further outwardly than in FIGS. 1–3. To facilitate withdrawal of the actuator from the mold, the peripheral wall of the actuator has an extended portion 27 beneath the nozzle 26 which projects outwardly so as to be slightly beyond the discharge end of said nozzle.

Figure 5:
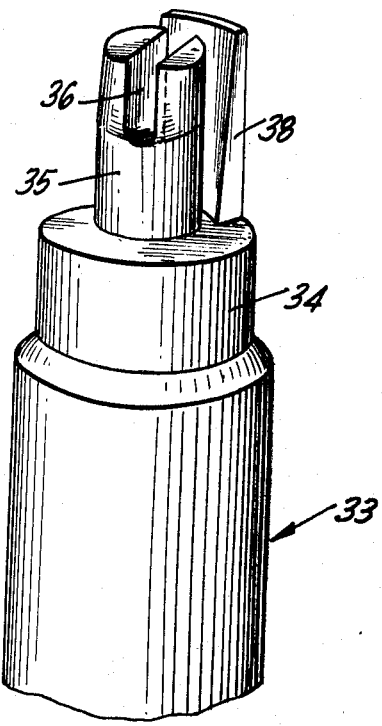
FIG. 5 is a perspective view of the male die for making the actuator illustrated in FIG. 1.
Figure 6:
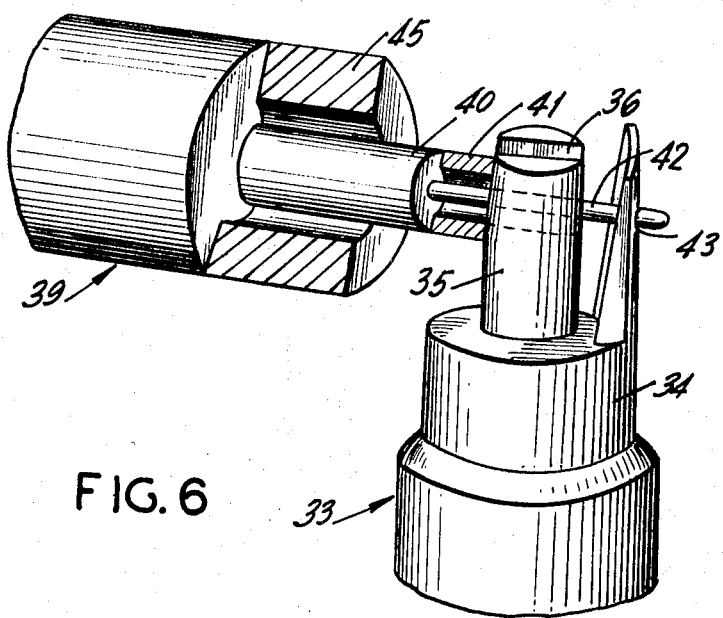
FIG. 6 is a perspective view of the relative position of the male die element and retractable side core element that form the actuator of FIG. 1 when disposed within a female die cavity (not shown).

In FIGS. 5–7 are shown the dies for making the actuator of FIG. 1. In these figures the female die 30 embodies a cavity 31 gated at 32 in any suitable manner. The male die 33 has a lower cylindrical portion 34 and an upper cylindrical portion 35 of smaller diameter, the longitudinal axis of the upper portion being coaxial with that of the lower portion 34. The upper portion 35 has a U-shaped recess 36 extending downward from its top. Lower portion 34 has a further projection 38 which is spaced from the upper portion 35. The die 39, which is retractable, has a nozzle-forming portion 40 terminating in the annular projection 41 which abuts the portion 35 as shown, said nozzle-forming portion 40 further having a centrally disposed projection 42 which extends through the recess 36 and a suitable opening 43 in the projection. A further core portion 44 disposed outwardly of the nozzle-forming portion 40 terminates in the projection 45. The actuator B is pressure molded while the parts are in the position described and after the cast has been made, the retractable die 39 is withdrawn, the mold sections are separated and the cast ejected from the female mold.

In molding actuators in a mold such as described, we find it convenient and desirable to use a thermoplastic polymer material which is somewhat resilient, for example, polyethylene. In forming the actuator, molten polymeric material is introduced through the runner and gate 32, or in any other suitable manner, and fills the entire mold cavity which is unoccupied by the male die and core. Following injection of the polymeric material, there is solidification of the molten material.

A further embodiment of the actuator of this invention is shown in FIG. 8, wherein the valve stem 50 has a wall 51 across the interior diameter of the valve stem which forms separated conduits 52 and 53, said wall 51 projecting beyond the end of the valve stem 50 as at 51a. The actuator 56 has a recess 59 in its bottom for snugly fitting the valve stem 50 short of the entire depth of the recess 59. Depending within the recess 59 is a member 66 which has a transverse slot 60 for snugly fitting the projection 51a of the wall 51, said projection 51a together with the laterally opposite wall of the recess 59 forming the chambers 55 and 58, respectively. Extending inwardly from chamber 58 is an upstanding recess 61 and from chamber 55 an upstanding recess 62, recesses 61 and 62 being on opposite sides of the projection 51a. Extending laterally outward toward an ejector zone 57, defined by the nozzle 54 is a conduit 64, which conduit 64 communicates with the recess 61 at its inner terminal. Extending laterally outward toward the ejector zone 57 is the conduit 65, which conduit 65 communicates with the recess 62 at its inner end.

While the illustrated actuator is mounted on a tubular valve stem and not otherwise attached to the container, it should be understood that the features herein could be provided in an actuating tab, which is hinged or otherwise connected to a surrounding cap body, for example, the hinged tab disclosed in United States application Ser. No. 298,660, filed July 30, 1963, now Patent No. 3,269,614, granted Aug. 30, 1966.

Moreover, further modifications within the scope of this invention include, for example, an actuator having a valve stem portion integral therewith and suitable for attachment to a movable valve member, said stem portion having separate product and propellant conduits extending therethrough and communicating at their upper ends with members corresponding to the chamber 16 and conduit 18 of FIG. 1. Thus rather than provide a first socket portion suitable for receiving a valve stem extending from a valve body, separate conduits can be molded in a stem integral with the actuator.

Further modifications include actuators having a stem portion integral therewith and a socket portion within and coaxial with the stem portion for receiving a hollow valve stem extending from a valve body, there being longitudinal spline(s) in the interior wall of the stem portion of the actuator or in the exterior wall of the valve stem attached to the valve body, which spline(s) form a conduit(s) defined by the interior wall of the stem portion of the actuator and the exterior wall of the hollow valve stem, the opening in said hollow valve stem providing a further separate conduit. In each of these further modifications the conduits in the valve stem may made to communicate with a chamber corresponding to chamber 16 and a rearwardly disposed conduit corresponding to conduit 18, both designated members being shown in FIG. 1.

While the illustrated actuator describes a propellant discharge orifice concentrically surrounded by a product discharge orifice, it should be understood that this relation depends on the particular conduit through which the product and propellant are flowed in the valve stem. Thus, the relation of the product and propellant conduits may be reversed by a valve stem arrangement such as shown in FIG. 8 of United States Patent No. 3,326,469, wherein the propellant conduit in the valve stem is surrounded by the product conduit. The actuator of this invention is suitable for use with the valve stem of said FIG. 8. Likewise, the actuator of FIG. 8 of this application may be modified to discharge product concentrically about propellant by constructing a valve stem wherein conduit 53 of the valve stem 50 communicates at its lower end with the product conduit and not with the propellant port 69 and having propellant port 69 communicate with conduit 52 of the valve stem 50.

A feature of the actuator of this invention is that the length of the propellant conduit is capable of maximization while maintaining the inward vertical portion of the propellant conduit within a projected periphery of the socket or stem portion of the actuator, thereby facilitating the molding operation. This capability of maximizing the length of the propellant conduit is attained by disposing the vertical portion of the propellant conduit that communicates with the propellant conduit in the valve stem on the opposite side of the longitudinal axis of the socket or stem of the actuator from the discharge orifice of the propellant conduit. With such arrangement the propellant conduit may be adjusted to the desired length by extending the condiut laterally and outwardly from the above referred to vertical portion. The lengthening of the conduit has the effect of lowering the discharge rate of propellant, while providing sufficient velocity to cause the product to ascend the product condiut and pass to its discharge end. Since the propellant represents a major cost of the dispensing unit, it is desirable to increase the product/propellant ratio without deleteriously affecting the discharge properties of the product. The discharge rate of the propellant may be lowered by decreasing the diameter of its flow condiut. However, there is a conduit diameter below which it is extremely difficult to maintain the uniformity throughout the length of the conduit. For most of the plastic materials used in the molding of aerosol actuators, diameters of .010″ or less usually cannot be maintained over any substantial length, or if maintained, require the exercise of extreme care and skill.

A further feature of the illustrated actuator is the provision of a depending member within the lateral portion of the product discharge condiut which provides a support for the lateral propellant conduit. A relatively thin tubular member extending from the vertical portion of the propellant passage would be extremely weak and subject to fracture.

I claim:

1. A valve actuator suitable for actuating the valve of a pressurized container, said actuator having a recess open at the bottom and separate conduits for flow of product and propellant, which conduits extend from the recess to a discharge ejector zone, wherein an upwardly directed portion of one of said conduits is disposed on the opposite side of the longitudinal axis of the recess from said discharge ejector zone.

2. The actuator of claim 1, wherein the terminal portions of the conduits at the ejector are concentric.

3. The actuator of claim 2, wherein the ejector is at the upstanding side wall of the actuator and the conduits have a portion parallel to the upstanding side wall, and a lateral portion connecting the portion of the conduits parallel to the upstanding side wall and the ejector.

4. The actuator of claim 1, wherein the ejector is at the upstanding side wall of the actuator and the conduits have a portion parallel to the upstanding side wall, and a lateral portion connecting the portion of the condiuts parallel to the upstanding side wall and the ejector.

5. A valve actuator according to claim 1, wherein a transverse conduit portion extends from said upwardly directed conduit portion to said ejector zone.

6. A valve actuator according to claim 5, wherein said transverse conduit portion extends through a member disposed at the upper end of said recess.

7. A valve actuator according to claim 1 in combination with a hollow valve stem projecting upwards from a pressurized container, wherein the valve stem has an internal transverse wall forming separate valve stem conduits, said wall extending beyond the upper end of the valve stem into sealing relation with said member, one of said valve stem conduits communicating with said upwardly directed conduit portion and the other of said valve stem conduits communicating with an annular conduit surrounding said transverse conduit.

8. A valve actuator and valve stem assembly according to claim 7, wherein a chamber forming part of said recess is disposed between said other valve stem conduit and said annular conduit and is in communication therewith.

9. A molded one-piece valve actuator having an ejector in its side wall which actuator is suitable for attachment to a hollow valve stem having separate conduits therein, said actuator provided at its bottom with a first socket to snugly fit a hollow valve stem of a pressurized container, a second socket of smaller cross-section extending inwardly from and coaxial with the first socket and adapted to snugly fit the outside wall of a conduit passing within and spaced from the interior wall of the valve stem, a first lateral conduit communicating with the second socket at one terminal and an ejector at the other terminal, a conduit separated from the second socket and projecting inwardly from the first socket and disposed on the opposite side of the longitudinal axis of the first socket from the ejector, and a second lateral conduit passing within the first lateral conduit and communicating at one terminal with the inwardly projecting conduit which extends from the first socket and at the other terminal with an ejector.

10. The actuator of claim 9, wherein the second lateral conduit is disposed within a member depending from a top wall portion of the second socket.

11. The actuator of claim 10, wherein the top upstanding portion of the second socket surrounds a substantial portion of the exterior wall of the depending member.

12. The actuator of claim 9, wherein the outer wall of the inwardly projecting conduit is a continuation of the wall forming the first socket.

References Cited

UNITED STATES PATENTS

| | | | |
|---|---|---|---|
| 3,326,469 | 6/1967 | Abplanalp et al. | 239—308 |
| 2,689,150 | 9/1954 | Croce | 239—340 XR |
| 2,888,208 | 5/1959 | Fedit | 239—308 |
| 3,040,991 | 6/1962 | Fedit | 239—340 XR |
| 3,185,352 | 5/1965 | Ghisolfi | 222—193 |
| 3,217,936 | 11/1965 | Abplanalp | 239—308 XR |

FOREIGN PATENTS 1,208,586  9/1959  France.

M. HENSON WOOD, JR., *Primary Examiner.*

MICHAEL Y. MAR, *Assistant Examiner.*

U.S. Cl. X.R.

222—193; 239—308, 318, 338, 573, 579